United States Patent [19]

Ochs

[11] Patent Number: 4,544,460
[45] Date of Patent: Oct. 1, 1985

[54] REMOVAL OF POTASSIUM CHLORIDE AS A COMPLEX SALT IN THE HYDROMETALLURGICAL PRODUCTION OF COPPER

[75] Inventor: Leonard R. Ochs, Tucson, Ariz.

[73] Assignee: Duval Corporation, Houston, Tex.

[21] Appl. No.: 272,024

[22] Filed: Jun. 9, 1981

[51] Int. Cl.$^4$ .............................................. C25C 1/12
[52] U.S. Cl. .................................. 204/107; 75/101 R;
75/104; 75/108; 75/114; 75/117; 423/27;
423/34; 423/42; 423/184; 423/463
[58] Field of Search ............. 204/107; 75/101 R, 104,
75/108, 114, 117, 74; 423/27, 34, 42, 184, 463

[56] References Cited

U.S. PATENT DOCUMENTS

| | | | |
|---|---|---|---|
| 3,736,238 | 5/1973 | Kruesi et al. | 204/105 R |
| 3,767,543 | 10/1973 | Hazen | 204/107 |
| 3,785,944 | 1/1974 | Atwood et al. | 204/107 |
| 3,798,026 | 3/1974 | Milner et al. | 75/104 |
| 3,879,272 | 4/1975 | Atwood et al. | 204/107 |
| 3,901,776 | 8/1975 | Kruesi et al. | 204/107 |
| 3,972,711 | 8/1976 | Goens et al. | 75/117 |
| 4,013,457 | 3/1977 | Goens et al. | 75/104 |
| 4,025,400 | 5/1977 | Cook et al. | 204/10 |
| 4,039,324 | 8/1977 | Stephens, Jr. et al. | 75/72 |
| 4,101,315 | 7/1978 | Peters et al. | 75/104 |
| 4,152,142 | 5/1979 | Schlitt, III et al. | 75/74 |

OTHER PUBLICATIONS

Gmelin's Handbuch Der Anorganischen Chemie, #60, Teil B, Lieferung 3, Verlag Chemie (1965), pp. 1017–1019.
Malik et al., Zeitschrift fur Anorganische und Allgemeine Chemie, vol. 299 (1959), pp. 322–327.

Primary Examiner—R. L. Andrews
Attorney, Agent, or Firm—Lowe, King, Price & Becker

[57] ABSTRACT

Cuprous chloride, which is contained in a reduced leach solution or pregnant liquor, can be recovered as a complex salt of alkali metal chloride, such as potassium chloride, or alkaline earth metal chloride or ammonium chloride. The salts are produced by oxidation of a copper ore, such as chalcopyrite, with ferric chloride and cupric chloride, and after removal of insolubles, by adding sufficient metallic copper to the solution to reduce cupric ions to cuprous ions so as to provide a solution containing 1.5 to 2.5 molal potassium chloride, or other metal or ammonium chloride, and cooling the resultant saturated solution to precipitate the potassium chloride-cuprous chloride complex salts and recovering the complex salts. Also provided as a method for recovery of pure copper metal by electrolysis of solutions derived from the complex salts wherein the impurities are diverted to an anode loop which is separated from the cathode loop by a diaphragm.

11 Claims, 1 Drawing Figure

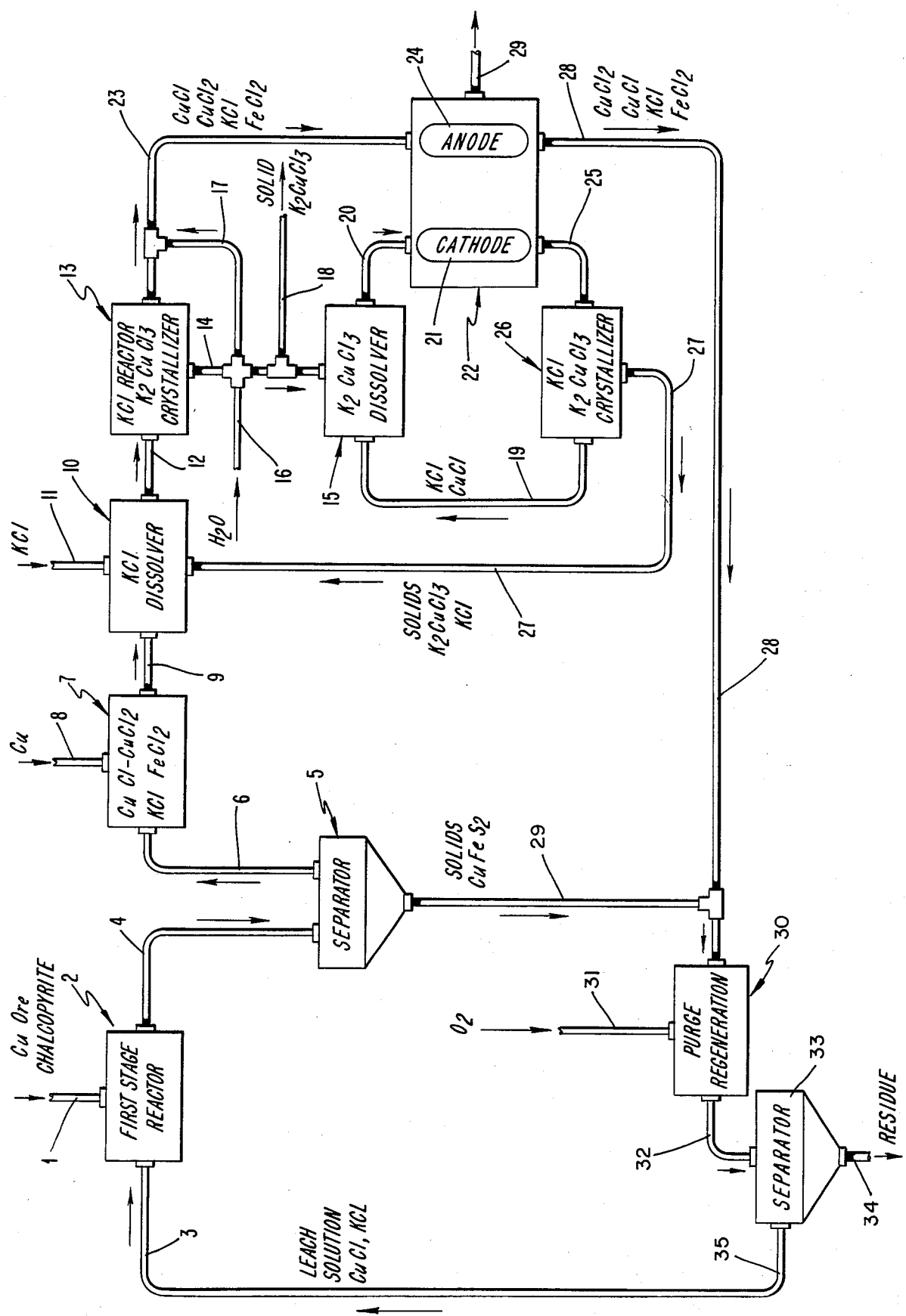

REMOVAL OF POTASSIUM CHLORIDE AS A COMPLEX SALT IN THE HYDROMETALLURGICAL PRODUCTION OF COPPER

TECHNICAL FIELD

This invention relates to the selective crystallization of alkali metal chloride-, alkaline earth metal chloride-, and/or ammonium chloride-cuprous chloride complex salts, for example $KCuCl_2$ or $K_2CuCl_3$, from reduced leach solutions obtained by the oxidation of copper sulfide ores. More particularly this invention relates to the recovery of these solid complex salts by crystallization in order to effect a separation from impurities. Also provided is a method for utilization of this crystallization technique in combination with the hydrometallurgical oxidation of chalcopyrite ores and subsequent electrolysis to produce pure copper metal.

BACKGROUND ART

Methods are known in the prior art concerning copper hydrometallurgy which involve recovery of cuprous chloride from process solutions with subsequent reduction to produce and recover copper metal. Patents of this type include U.S. Pat. Nos. 3,798,026, 3,972,711, 4,039,324 and 4,013,457. Major work in this field may be found in U.S. Pat. Nos. 3,785,944 and 3,879,272 to Atwood et al which are concerned with hydrometallurgical processes for polution free recovery of metallic copper from copper ores such as chalcopyrite, the most common copper-containing ore in the U.S. Pat. No. 3,785,944 describes a basic hydrometallurgical process for processing copper sulfide ore concentrates, especially those containing chalcopyrite. This process has four basic stages: an oxidation stage in which copper-containing materials are oxidized with a solution containing ferric chloride and cupric chloride to form a solution containing ferrous chloride and cuprous chloride; a reduction stage in which any remaining cupric chloride in the solution from the oxidation stage is reduced to cuprous chloride, preferably by use of fresh cement copper; a copper recovery stage in which metallic copper is recovered from the cuprous chloride solution, preferably by electrolysis; and a regeneration-purge stage in which ferric chloride and cupric chloride are regenerated by oxidation with concurrent purge of excess iron as well as sulfate ions and other impurities. The resulting leach solution is then used to oxidize additional copper-containing ore.

U.S. Pat. No. 3,879,272 to the same inventors describe improvements on the process of 3,785,944, especially in combining the oxidation and regeneration-purge stage and use of KCl in the system. In these patents, the reduced leach solution or electrolyte which is subsequently electrolyzed, contains impurities which are electrolyzed with the copper and it is desirable that these impurities be removed prior to electrolysis.

U.S. Pat. No. 3,972,711 claims an improvement over the Atwood patents on the basis that because the reduced leach solution of Atwood contains certain impurities, improved results are obtained by crystallizing cuprous chloride from the system so as to produce a purer grade of copper. In this process, the cuprous chloride is crystallized in the presence of a specified amount of cupric chloride.

The present invention represents an improvement over the processes of the above-discussed patents in obtaining a purer grade of copper because the presence of impurities is minimized within the system prior to electrolysis by providing a crystallization stage wherein solids in the form of potassium chloride-cuprous chloride salts are crystallized and removed from the system to increase the purity of the resultant copper.

Complex salts of potassium chlorides and copper chloride are known in the art and have been reported in the literature by several authors. Species such as $KCuCl_2$, $K_2CuCl_3$ and $KCuCl_2 \cdot H_2O$ are reported by the following authors: J.J.P. Valeton and W. Frömel Z. anorg. allgem. Chemie, 137, 91 (1924); O. A. Chaltykyan, Zhur. Obshchei Khim., 18, 1626 (1948); W.U. Malik, et al., Z. anorg. allgem. Chemie, 299 322 (1959). However, none of these complex salts are recovered and produced by crystallization from process streams of any type.

DISCLOSURE OF INVENTION

It is accordingly one object of the present invention to provide a procedure for the production and recovery of metal chloride-cuprous chloride complex salts from process streams produced during the hydrometallurgical oxidation of copper ores or concentrates.

A further object of the invention is to provide a procedure for the crystallization of complex salts of potassium chloride-cuprous chloride from process streams recovered from the oxidation of chalcopyrite ores and recovery of pure copper metal therefrom.

A still further object of the invention is concerned with the selective crystallization of potassium chloride-cuprous chloride complex salts such as, for example, $KCuCl_2$ or $K_2CuCl_3$, from aqueous process streams produced during the hydrometallurgical oxidation of chalcopyrite and including the crystallization of $K_2CuCl_3$ as a preferred material.

Other objects and advantages of the present invention will become apparent as the description thereof proceeds.

In satisfaction of the foregoing objects and advantages, there is provided by this invention a method for the production and recovery of complex salts of a metal or ammonium chloride and cuprous chloride which comprises:

(a) forming a solution containing cuprous chloride, said solution preferably being a reduced leach solution or pregnant liquor obtained by oxidation of copper ores and concentrates with ferric chloride and cupric chloride;

(b) adding sufficient metal or ammonium chloride to the solution to provide a resulting solution having a concentration of about 4.0 to 6.00 molal of added metal ion if the metal ion is univalent, and about 1.333 to 2.00 molal if the added metal ion is trivalent, and adding sufficient metal chloride such that at least two moles of chloride ion are added for every mole of copper that must be removed from the system;

(c) allowing a sufficient time period for the complex salt to form;

(d) allowing the complex salt crystals of metal chloride-cuprous chloride to precipitate; and (e) recovering the complex salt.

Also provided by this invention is an improved method for the hydrometallurgical processing of copper ores such as chalcopyrite which includes the procedure for crystallization and separation of complex salts of metal chloride and cuprous chloride, preferably potassium chloride and cuprous chloride, so as to provide a pure copper product, which process comprises:

(a) leaching a copper sulfide-containing ore with a leach solution containing ferric chloride and cupric chloride to effect substantial solubilization of the copper content of the ore in the form of cuprous chloride while simultaneously reducing the ferric chloride and cupric chloride components of the leach solution to ferrous chloride and cuprous chloride;

(b) separating the resultant mixture into a liquid portion containing cuprous chloride, cupric chloride, potassium chloride, ferrous chloride, and other alkali metal and alkaline earth metal chloride salts, and a solid portion containing insolubles comprising liberated sulfur and reacted ore;

(c) optionally adding a sufficient amount of metallic copper to the liquid portion to reduce cupric ions present to cuprous ions if necessary;

(d) adding sufficient potassium chloride to the liquid to provide a solution having a concentration of about 4.0 to 6.00 molal potassium, and adding sufficient potassium chloride such that at least two moles of chloride ion are added for every mole of copper that must be removed from the system;

(e) cooling the solution to effect precipitation of at least a portion of the potassium chloride-cuprous chloride complex salt in a first crystallizer stage, and separating the complex salt containing the cuprous chloride-potassium chloride salts from the leach potassium chloride and ferrous chloride in solution;

(f) dissolving the potassium chloride-cuprous chloride complex salt in a recycle stream obtained from electrolysis, the recycle stream containing potassium chloride and cuprous chloride, and passing the stream to the cathode of an electrolysis reactor where $Cu^o$ is plated at the cathode;

(g) simultaneously passing the remaining reduced solution from the separation step (e) above to the anode of the electrolysis reactor where cuprous ion is oxidized to cupric ion;

(h) recovering a cuprous chloride-potassium chloride solution from the cathode electrolysis reactor, passing to a second crystallizer stage and removing primarily potassium chloride, recycling to the KCl dissolver, and recycling the resulting solution to the recycle stream to dissolve the CuCl-KCl complex salts in step (f);

(i) removing a regeneration-purge stage feed solution from the anode of the electrolyzer, combining with insolubles from the separator of step (b) and subjecting to a regeneration-purge leach in the presence of excess oxygen-containing gas to oxidize cuprous ion to ferric ion; and (j) separating the resulting product to remove solids from the material and provide an oxidation leach solution feed containing cupric chloride, ferric chloride, and potassium chloride and recycling the solution as leach solution to step (a).

BRIEF DESCRIPTION OF THE DRAWINGS

Reference is now made to the accompanying drawing, wherein:

The figure is a schematic diagram of a complete processing system for the recovery of metallic copper from copper ores utilizing the step of crystallizing and removing potassium chloride-cuprous chloride complex solids from the system.

BEST MODE FOR CARRYING OUT THE INVENTION

As pointed out above, the prior art is aware of processes for the hydrometallurgical treatment of copper ores such as chalcopyrite and other copper containing materials to provide a pollution free recovery of metallic copper from these copper ore materials. In general, the process involves initial reaction of copper sulfide-containing ores with a leach solution containing cupric chloride and ferric chloride, to produce cuprous chloride from the ore, recovery of metallic copper, usually by electrolysis, and regeneration of the ferric chloride and cupric chloride by oxidation with concurrent purge of excess iron as well as sulfate ions and other impurities. This process is well described in U.S. Pat. No. 3,785,944 to Atwood and the disclosure of that patent is incorporated herein by reference. U.S. Pat. No. 3,879,272 by the same inventors relates to the same process and states that a desired molal concentration of chloride ion should be maintained by addition to the process solution of sodium chloride, potassium chloride, magnesium chloride, or combinations of these materials with potassium or combinations of these materials, with potassium chloride being a preferred source of chloride ions when used in conjunction with the other salts cited above. In addition, ammonium chloride can be included as a substitute for potassium chloride as described hereinafter.

While the present invention is described with respect to the use of potassium chloride and its complex salt with cuprous chloride, it will be understood that other chloride salts can be used in the process including certain alkali metal chlorides and ammonium chloride, and as mixtures thereof. Since the present invention concerns an improvement on the previously described processes collectively and in one embodiment, the disclosures of the patents are hereby specifically incorporated herein by reference.

In the processes of these prior patents, a particular problem involves removal of impurities from the system so that the resulting copper product obtained by electrolysis will be in a substantially pure form. According to the present invention, it has been found that if the reduced leach solution or pregnant liquor from the first stage reaction, which contains an aqueous solution of cuprous chloride, cupric chloride, potassium chloride and ferrous chloride, is treated so that a complex salt containing potassium chloride and cuprous chloride is removed from the system, that the resulting metallic copper recovered from electrolysis will be of improved purity. The present invention thus provides a method for minimizing contamination of the plated copper obtained by electrolysis by crystallizing potassium chloride and cuprous chloride out of the system as complex salts from the reduced leach solution which thus diverts the impurities to the anode loop of the system. Thus, in this invention, a relatively pure potassium chloride-cuprous chloride complex salt is removed from the reduced leach solution by crystallization which therefore separates impurities from the copper salts so that a purer copper metal product can be recovered than known in the prior art.

The complex salts as recovered are valuable in that they may be incorporated into the hydrometallurgical process described herein in the second embodiment and by the accompanying drawing. In a separate embodiment, however, the complex salt may be recovered and removed from the system and processed as described in copending application Serial No. 272,025 of John B. Sardisco, entitled "PRODUCTION OF CUPROUS CHLORIDE AND POTASSIUM CHLORIDE", filed of even date herewith. According to the disclosures in this pending patent application, this complex salt may be processed to recover solid cuprous chloride and potassium chloride as well as silver or silver salts if they are present in the impurities. Thus, the complex salt produced in accordance with this invention may be further processed to produce useful and valuable materials such as potassium chloride and cuprous chloride.

As pointed out above, the starting material for one embodiment of the present invention is a reduced leach solution or a pregnant liquor which is obtained by oxidation of a copper sulfide ore such as chalcopyrite, with ferric chloride and cupric chloride. In this specification, ores and copper concentrates are used interchangeably. Sufficient metallic copper or equivalent material is optionally added to the reduced leach solution so that a sufficient amount of the cupric ions present in the solution are reduced to cuprous ions to provide a solution containing about 1.5 to 2.5 molal cuprous chloride. The copper metal added may be metallic copper in any form such as cement copper or the like. At this point, the temperature of the solution is at least about 65° C., and preferably between 65° C. and 90° C. Thereafter, in accordance with the invention, a sufficient amount of potassium chloride is added to provide a solution containing potassium ion in the range of about 4.0 to 6.00 molal. The potassium chloride may be fresh or make up potassium chloride, but preferably in the continuous system it is recycled potassium chloride obtained by precipitation from the cathodic compartment of the electrolysis step. Sufficient potassium chloride is added to provide at least 2 moles of chloride ion for every mole of copper that must be removed from the system.

After the proper molal concentration of the potassium chloride is achieved, the resultant solution is saturated and is then cooled sufficiently to allow precipitation of the potassium chloride-cuprous chloride salt complex. It has been found that cooling the solution to the range of about 20°-35° C. is sufficient to effect substantially complete precipitation of the complex salt crystals. The salt crystals may then be recovered from the solution for use in processing as described in the copending application Serial No. 272,025 of John B. Sardisco, filed of even date, or the complex salt may be processed in the embodiment as set forth by the process flow sheet described by FIG. 1.

Reference is now made to FIG. 1 which describes a continuous process or method for the recovery of a pure grade of copper from a copper ore such as chalcopyrite. As may be seen in the flow diagram, a copper sulfide ore, such as chalcopyrite is initially introduced by line 1 to first stage leaching reactor 2 wherein the copper sulfide ore concentrates are oxidized in a solution containing ferric chloride and cupric chloride contained in the leach solution from line 3. This reaction is preferably carried out at the normal boiling temperature of about 105-110° C. at atmospheric pressure.

In this oxidation stage, copper-containing materials are oxidized with a solution containing ferric chloride and cupric chloride to form a solution containing ferrous chloride and additional amounts of cuprous chloride. The resulting reaction mixture is then removed by line 4 to separator 5. Separator 5 is preferably a thickener from which an overflow solution containing cuprous chloride, cupric chloride, potassium chloride and ferrous chloride is removed. The insolubles, which comprise any free sulfur and unreacted chalcopyrite, are removed by line 29 for further reaction in the regeneration-purge reactor 30.

The overflow from the separator, which is a leach solution or pregnant liquor, is removed by line 6 to reactor 7 where sufficient metallic copper, preferably cement copper, is added by line 8 to provide a solution containing about 1.0 to 2.5 molal, and preferably about 1.5 to 2.0 molal cuprous chloride in a reduction stage. In the above reduction stage, any remaining cupric chloride in the solution from the oxidation stage can be reduced to cuprous chloride.

The resulting solution is then removed by line 9 to the potassium chloride dissolver 10, preferably at a temperature in the range of 65° C. to about 85° C. To the dissolver 10, sufficient potassium chloride is added to the solution by line 11 to provide a potassium concentration of about 5.0 to 5.25 molal, and at least two moles of chloride per mole of copper that must be removed as product from the electrolyser 22. As pointed out above, $NH_4Cl$ or chlorides of the larger size alkali metal ions (Rb, Cs) or an equivalent weight of the larger alkaline earth metals ions (Ba, Sr), may be substituted for, or used in combination with the potassium chloride.

A substantial amount of KCl and/or $NH_4Cl$ is added as recycle from line 27 but makeup KCl and/or $NH_4Cl$ may be added as necessary by line 11. When the KCl solution from line 27 is added to dissolver tank 10, the cooler solid will quench the solution to some extent, and usually drop the temperature about 10°-20° C.

The mixture from dissolver 10 is then introduced by line 12 into the KCl reactor or $K_2CuCl_3$ crystallizer 13 and the saturated solution is allowed to cool to about 20° to 50° C., preferably 30°-40° C., where complex salt crystals are allowed to precipitate. When KCl is employed, these complex salt crystals comprise the complex salts of potassium chloride and cuprous chloride and are removed by line 14 to the $K_2CuCl_3$ dissolver 15. If $NH_4Cl$ is used, the complex salt is $(NH_4)_2CuCl_3$. Prior to introduction into dissolver 15, the $K_2CuCl_3$ or $(NH_4)_2CuCl_3$ solids are washed with water from line 16, or preferably a solution which is saturated with the complex salt such as from line 19. The wash waters are then combined by line 17 with the filtrate from crystallizer 13 which is contained in line 23.

At this point, all or a portion of the $K_2CuCl_3$ solids may be recovered from line 18. However, if the salt is removed from the system, it will be understood that the balance of the recycle system will have to be readjusted.

Into dissolver 15 is introduced by line 19 a recycle solution of potassium chloride and cuprous chloride which dissolves the complex salts in dissolver 15. The addition here is of a hot solution of KCl and CuCl from line 19 to the cold solids in the dissolver 15. Therefore, it is necessary to apply heat to achieve a temperature of about 80°±10° C. to achieve solution in dissolver 15.

The complex salt solution from dissolver 15 containing cuprous chloride and potassium chloride is then sent by line 20 to the cathode chamber 21 of electrolysis unit 22 for metal recovery. In the meantime, the reduced leach solution from the crystallizer 13 containing cuprous chloride, cupric chloride, potassium chloride and ferrous chloride, is passed by line 23 to the anode chamber 24 of the electrolysis unit 22.

In this electrolysis step or metal recovery stage, the cuprous chloride from the reduction stage is preferably electrolyzed to deposit metallic copper at the cathode 21 and to regenerate cupric chloride at the anode chamber 24. The electrolysis is so arranged as to deposit at the cathode an amount of copper equal to that introduced to the process from lines 1 and 8, and which is at the same time no more than the amount of cuprous copper in the anolyte feed solution in stream 23. This provides for oxidation at the anode of the cuprous copper remaining in solution to cupric chloride and avoids the undesired oxidation of ferrous chloride to ferric chloride in the electrolytic cells.

After the electrolysis step, the remaining solution of cuprous chloride and potassium chloride, copper metal having been removed at 29, is cycled to a second crystallizer 26 by line 25 where primarily potassium chloride with some potassium chloride-cuprous chloride complex salt are crystallized out and recycled to the KCl dissolver 10 by line 27. The remaining aqueous solution, containing chlorides of potassium and copper, is recycled by line 19 to the $K_2CuCl_3$ dissolver 15 for dissolution of additional complex salt.

From the electrolysis system 22 is also recovered the solution containing cupric chloride, cuprous chloride, potassium chloride and ferrous chloride. This solution in line 28 is combined with the first stage reaction solids from line 29, and passed to the regeneration-purge reactor 30. In this reactor, oxidation is effected by the addition of an excess of an oxygen containing gas such as air or oxygen from line 31 to effect oxidation of cuprous ion to cupric ion and ferrous ion to ferric ion. The product resulting from this reaction is removed by line 32 to a thickener or other separator 33 where residue is removed at line 34 and the first stage leach solution feed then recycled to the first stage chalcopyrite reactor by lines 35 and 3.

In this regeneration-purge stage, the ferrous chloride in the spent electrolyte is oxidized with oxygen to ferric chloride and any cuprous chloride is oxidized to cupric chloride. Any iron dissolved from the ore being leached, or other excess iron dissolved into the system, is precipitated as a basic iron oxide. Excess sulfate ions formed from any oxidation of sulfur are also precipitated with the iron. Other contaminants are also precipitated with the iron hydrate whereby their concentration in the process solution is maintained at an acceptable level. The solution containing the regenerated ferric chloride and cupric chloride is recycled to the oxidation stage.

As may be seen from the flow sheet of the drawing, a copper ore such as chalcopyrite can be processed to recover copper of greater purity than is described in the prior art because the solid complex salt of potassium chloride-cuprous chloride is removed from the reduced feed solution, which contains the impurities prior to electrolysis.

The following examples are presented to illustrate the invention but it is not to be considered as limited thereto. In the examples and throughout the specification, parts are by weight unless otherwise indicated.

EXAMPLE 1

This example shows formation of the complex salt and its crystallization from a reduced leach solution or pregnant liquor. The pregnant liquor has the following approximate compositions:

| | | |
|---|---|---|
| $Cu_{total}$ | 1.72 molal | |
| CuCl | 1.46 molal | 6.58% $Cu_{total}$ |
| $CuCl_2$ | 0.26 molal | |
| $FeCl_2$ | 0.63 molal | 2.12% Fe |
| NaCl | 3.50 molal | 4.84% Na |
| KCl | 1.45 molal | 3.41% K |
| $CaCl_2$ | 0.10 molal | 0.24% Ca |
| $ZnCl_2$ | 0.25 molal | 0.98% Zn |
| $MgCl_2$ | 0.25 molal | 0.37% Mg |
| $PbCl_2$ | 0.025 molal | 0.31% Pb |
| HCl | 0.24 molal | 0.53% HCl |
| $H_2SO_4$ | 0.06 molal | 0.35% $H_2SO_4$ |
| Cl-Total | 9.68 molal | |
| $H_2O$ | — | 60.2% $H_2O$ total |

This solution was an artificial pregnant liquor prepared from normal technical grade reagents and was designed to simulate the pregnant liquor obtained from the chalcopyrite hydrometallurgy system. In order to produce the complex salt $K_2CuCl_3$, sufficient metallic copper was added to the pregnant liquor to effect reduction of the cupric ion and obtain a solution which contains 2.0 molal CuCl. This solution was then heated to 65° C. and sufficient potassium chloride solid was added to provide a solution containing 5.0 to 5.25 molal KCl. This solution was then cooled to 25° C. and crystals allowed to precipitate and be collected. The recovered crystalline product was a complex salt of KCl and CuCl of the formula $K_2CuCl_3$.

EXAMPLE 2

For this example, the process flowsheet described by the accompanying figure is utilized for the purification of cuprous chloride by the removal of the complex salt, $K_2CuCl_3$ which is used for the production of metallic copper. In this example, 2 moles of chalcopyrite ($CuFeS_2$) concentrate is introduced into the first stage reactor and reacted at a temperature of about 107° C. (or the normal boiling temperature of the reacting solution) with the first stage leach feed solution which is made up of 3.70 moles of $CuCl_2$, 9.70 moles of KCl, 10.50 moles of NaCl, 0.30 kilograms of water. After residing in the reactor for a period of time ranging from about 75 minutes to about 120 minutes, the reacted slurry is transferred to a thickener, or other liquid-solids separation device, where a liquid portion, comprising about 4.20 moles of CuCl, 0.5 moles of $CuC_2$, 9.60 moles of KCl, 10.50 moles of NaCl, 1.40 moles of $FeCl_2$, 1/12 (one twelfth) mole of $H_2SO_4$, and 0.5 moles of HCl, is removed from the remaining insoluble solids. The insoluble solids, which contain about 50% of the initial chalcopyrite, are removed from the liquid-solid separation device and comprise the first stage extraction solids.

About 0.5 moles of metallic copper, preferably a copper cement, is added to and mixed with the liquid portion in a secondary reduction reactor at a temperature of about 80° C. in order to react the remaining cupric chloride to cuprous chloride and simultaneously react the metallic copper to cuprous chloride. This results in a solution that contains about 5.20 moles of CuCl. Any insolubles are removed at this time. An additional 5.0 moles of KCl (2.0 moles of KCl for each mole of copper that must be removed from the process) are added to the hot solution and dissolved, providing a solution which contains 14.6 moles of KCl which is equivalent to a relative KCl concentration of about 4.87 molal. This solution is then cooled to a temperature of between 25.0° C. and 30° C. and a crystalline product collected. These crystals, which comprise 2.5 moles of the solid complex salt of KCl and CuCl which has the stoichiometric formula $K_2CuCl_3$, are removed from the crystallizer as a solid material. In the meantime, the solution comprising reduced anolyte feed solution, containing 2.70 moles of CuCl, 9.60 moles of KCl, 1.40 moles of $FeCl_2$, 10.50 moles of NaCl, 1/12 mole of $H_2SO_4$ and 0.50 moles of HCl, is passed through the anode compartments of the electrolysis cells which are partitioned with diaphragms. The $K_2CuCl_3$ complex salt is transferred to a reactor and dissolved in a hot aqueous recycle solution which contains 16.0 moles of KCl, 3.6 moles of CuCl, 14.0 moles of NaCl, and 4.0 kilograms of water. The resulting solution containing 6.1 moles of CuCl, 21.0 moles of KCl, and 14.0 moles of NaCl, is forwarded to the cathode compartment of the electrolysis cells wherein cuprous chloride is electrolyzed to deposit metallic copper at the cathodes and cupric chloride is regenerated at the anodes. Metallic copper (2.5 moles) together with any silver deposited therewith is removed from the electrolysis cells.

The oxidized solution from the anode compartments of the electrolysis cells, which is second stage leach solution feed comprising 2.5 moles of regenerated $CuCl_2$, 0.20 moles of CuCl, 9.60 moles of KCl, 10.50 moles of NaCl, 1.40 moles of $FeCl_2$, 1/12 moles of $H_2SO_4$, and 0.5 moles of HCl, is combined with the unreacted solids from the first stage liquid-solid separation step and sent to oxidation and final reaction with oxygen in a second stage chalcopyrite reactor or the regeneration-purge step, at a reaction temperature of about 130° C. and a total pressure of 60 psig. In this oxidation stage, cuprous chloride is oxidized to cupric chloride, ferrous chloride is oxidized to ferric chloride and hydrated ferric oxides, and the remaining chalcopyrite is reacted to cupric chloride and hydrated ferric oxides and elemental sulfur. The resulting oxidized mixture or slurry is then subjected to thickening or a liquid-solid separation step to remove the reacted chalcopyrite or tailings, e.g., excess iron oxides and sulfates, elemental sulfur, etc., and the resultant aqueous first-stage feed leach solution, which comprises 3.70 moles of $CuCl_2$, 9.60 moles of KCl, 10.50 moles of NaCl, 0.30 moles of $FeCl_3$, 0.10 moles of $FeCl_2$, and 3.00 kilograms of water, is recycled to the first stage chalcopyrite reactor for reaction with fresh ore or concentrate. In the meantime, the hot (75° C. or hotter) catholyte, now depleted of CuCl by electrolysis, is cooled to about 35° C. in order to precipitate about 5.0 moles of crystalline KCl which is then collected for recycle to the hot solution from the secondary reduction reactor. The now KCl depleted spent catholyte is reheated and recycled to the $K_2CuCl_3$ reactor to dissolve the complex salt and thereby prepare this solution as feed to the electrolysis step.

To the overflow is added about 0.5 moles of cement copper to provide a solution that contains 5.5 moles of cuprous chloride in a reduction stage whereby most of the remaining $CuCl_2$ is reduced to CuCl at a temperature of about 80° C. The cement copper is solubilized as cuprous chloride. The solution is then cooled to about 65° C. with a heat exchanger and any insolubles are removed. At 65° C., an additional 5.0 moles of KCl are added to provide a solution which is about 5.2 molal KCl. This solution is then cooled to 25° C. and crystals collected. The crystals, which comprise 2.5 moles of the solid complex of KCl and CuCl, are removed from the crystallizer as solid material. In the meantime, the solution comprising reduced anolyte feed solution, containing 3.0 moles CuCl, 5 moles KCl, 2 moles $FeCl_2$, and 1/12 mole $H_2SO_4$, is passed through electrolytic cells which are partitioned with diaphragms. The $K_2CuCl_3$ solids complex is transferred to a reactor and dissolved in a recycle aqueous solution which contains 2 mole KCl and 1.0 mole CuCl. The resulting solution containing 3.5 moles of CuCl and 6 moles KCl is forwarded to the cathode of the electrolysis unit. Cuprous chloride is electrolyzed to deposit metallic copper at the cathodes and to regenerate cupric chloride at the anodes. Metallic copper (2.5 moles) together with any silver deposited therewith is removed from the electrolytic cells.

From the electrolysis there is removed a mixture of 1 mole of CuCl and 6 moles KCl which is sent to a second crystallizer from which 5.0 moles of KCl are crystallized out and recycled to the first stage crystallizer. The solution from the crystallizer comprising 1 mole KCl and 1.0 mole CuCl is recycled to the $K_2CuCl_3$ reactor.

The solution from the electrolytic cells, which is second stage leach solution feed comprising 2.5 moles regenerated $CuCl_2$, 0.5 moles CuCl, 5.0 moles KCl, 2.0 moles $FeCl_2$, and 1/12 mole $H_2SO_4$, is combined with the unreacted solids from the thickener and sent to oxidation with oxygen in a second stage chalcopyrite reactor or the regeneration-purge step, at a reaction temperature of about 130° C. and a pressure of 60 psig. In this oxidation stage, cuprous chloride is oxidized to cupric chloride and ferrous chloride is oxidized to ferric chloride. The resulting oxidized mixture is then subjected to thickening to remove tailings, e.g., excess iron, sulfates, etc., and the resultant first stage leach solution feed is recycled to the first stage chalcopyrite reactor for reaction with ore.

EXAMPLE 3

The impurity distribution during the crystallization of $K_2CuCl_3$ from pregnant liquor obtained according to the process of U. S. Pat. No. 3,785,944 was determined. Of the following impurities, Ag, Sb, Bi, As, Pb, Fe, Se, Te, Mn, Zn, and Ni, only Pb was concentrated in the double salt ($K_2CuCl_3$). The absolute amount of Ag that crystallized with the $K_2CuCl_3$ increased as the concentration of Ag in the pregnant liquor increased.

The double salt, $K_2CuCl_3$, was crystallized from the pregnant liquor by adding KCl to the liquor at an elevated temperature and then cooling. The purpose of this experiment was to determine the distribution of the impurities; Ag, Sb, Bi, As, Pb, Fe, Se, Te, Mn, Zn, and Ni, during the production of $K_2CuCl_3$ from the pregnant liquor with subsequent washing of the crystals.

To produce the double salt, $K_2CuCl_3$, sufficient metallic copper was added to the pregnant liquor to reduce the cupric ion and obtain a solution which contained 2.0 molal CuCl. This solution was then heated to 65° C., and sufficient potassium chloride solid was added to provide a solution containing 4.0 to 6.00 molal KCl. Then the solution was cooled to 25° C. to crystallize the double salt. The crystalline product was filtered and washed with a saturated solution of KCl or $K_2CuCl_3$ and dried in a stream of nitrogen. In some cases the crystals were rinsed with acetone before drying. The volume of wash used was approximately equal to the volume of mother liquor. For two of the tests, the silver concentration of the pregnant liquor was increased by the addition of $AgNO_3$.

Table I below is an analysis of the pregnant liquor used in the tests.

TABLE I

| Ion | Quantity |
|---|---|
| K | 4.41 Wt. % |
| Cu | 5.88 Wt. % |
| Ag | 12 ppm |
| Sb | 8.4 ppm |
| Bi | 36 ppm |
| As | 3.7 ppm |
| Pb | 937 |
| Fe | 1.03 Wt. % |
| Se | <0.55 ppm |
| Te | <0.62 ppm |
| Mn | 459 ppm |
| Zn | 1.13 Wt. % |
| Ni | 70 ppm |

The following Table II contains the weight ratio of the component ions to copper after the metallic copper and the KCl were added to the pregnant liquor (impurities contained in the KCl were taken into account; total concentration of Ag in the liquor was 12 ppm).

TABLE II

| Ion | Wt. Ratio of Ion to Cu |
|---|---|
| K | 1.90 |
| Ag | $2.07 \times 10^{-4}$ |
| Sb | $1.43 \times 10^{-4}$ |
| Bi | $6.10 \times 10^{-4}$ |
| As | $0.63 \times 10^{-4}$ |
| Pb | $157 \times 10^{-4}$ |
| Fe | 0.175 |
| Se | $0.094 \times 10^{-4}$ |
| Te | $0.105 \times 10^{-4}$ |
| Mn | $75.0 \times 10^{-4}$ |
| Zn | 0.193 |
| Ni | $11.9 \times 10^{-4}$ |

For the pregnant liquors to which additional silver was added, the weight ratio of Ag to Cu was as follows.

| Ag. Conc. in Liq. | Wt. Ratio of Ag to Cu |
|---|---|
| 120 ppm | $21.0 \times 10^{-4}$ |
| 130 ppm | $22.3 \times 10^{-4}$ |

For these pregnant liquors, the weight ratios of all the other ions to Cu are the same as those given in the above table.

Table III contains the exact amounts of pregnant liquor, KCl, Cu metal, and added $AgNO_3$ for each of the experiments. It also describes the method of washing the $K_2CuCl_3$ crystals, the analyses of the washed crystals, and the weight ratio of impurity to copper for the mother liquor and washed crystals. Essentially, all the tests were duplicate runs except for the method of washing the crystals and the amount of $AgNO_3$ added to the pregnant liquor.

Table IV is a tabulation of the material balances for each run. The balances for K and/or Cu are high because the wash waters were not taken into account when computing the weight of K and/or Cu in the input.

These results show that a relatively pure double salt can be crystallized from the pregnant liquor with subsequent washing of the crystals. Of the impurities studied, only Pb was concentrated in the double salt. Also, the absolute amount of Ag that crystallized with the $K_2CuCl_3$ increased as the concentration of Ag in the pregnant liquor was increased.

TABLE III

Crystallization of Double Salt: Inputs and Results

| Run Number | A | | | B | | | C | | | D | | |
|---|---|---|---|---|---|---|---|---|---|---|---|---|
| Prep. of $K_2CuCl_3$ | | | | | | | | | | | | |
| Preg. Liq. Gms | 271 | | | 271 | | | 272 | | | 274 | | |
| KCl, Gms | 35 | | | 35 | | | 35 | | | 35 | | |
| Cu°, Gms | 3 | | | 3 | | | 3 | | | 3 | | |
| $AgNO$, Gms | 0 | | | 0 | | | 0 | | | 0 | | |
| ppm Ag, Preg. Liq. | 12 | | | 12 | | | 12 | | | 12 | | |
| Method for Washing Crystals | Sat'd. Kcl Soln, dried with $N_2$ | | | Sat'd. $K_2CuCl_3$ Soln. dried with $N_2$ | | | Sat'd. KCl Soln. acetone, dried with $N_2$ | | | Sat'd. $K_2CuCl_3$, Acetone dried with $N_2$ | | |
| | Composition | Ion/Cu | | Composition | Ion/Cu | | Composition | Ion/Cu | | Composition | Ion/Cu | |
| Ion (Wt. %) | Double Salt | Mother Liquor | Double Salt | Double Salt | Mother Liquor | Double Salt | Double Salt | Mother Liquor | Double Salt | Double Salt | Mother Liquor | Double Salt |
| Cu | 25.20 | — | | 25.37 | | | 24.51 | | | 25.12 | | |
| K | 32.74 | 1.89 | 1.31 | 33.54 | 2.0 | 1.32 | 35.59 | 2.92 | 1.45 | 34.45 | 3.12 | 1.37 |
| Ag × $10^4$ | 25.2 | 5.31 | 0.38 | 13.78 | 6.15 | 0.54 | 10.6 | 6.22 | 0.43 | 11.0 | 5.13 | 0.44 |
| Sb × $10^4$ | 2.38 | 7.21 | 0.095 | 4.25 | 4.7 | 0.17 | 2.61 | 1.39 | 0.11 | 3.94 | 4.23 | 0.16 |
| Bi × $10^4$ | 3.58 | 23.96 | 0.14 | 1.24 | 24.6 | 0.05 | 1.09 | 21.9 | 0.04 | 0.95 | 20.6 | 0.04 |
| As × $10^4$ | 2.96 | 3.20 | 0.12 | 2.93 | 3.7 | 0.12 | 2.11 | 2.2 | 0.09 | 3.33 | 1.8 | 0.13 |
| Pb × $10^4$ | 4,200 | 33.3 | 168 | 3,600 | 103 | 142 | 3,300 | 167 | 135 | 4800 | 25.6 | 191 |
| Fe × $10^4$ | <10 | 4100 | <0.4 | 7.4 | 6150 | 0.29 | 30 | 5600 | 1.2 | 25 | 4660 | 1.0 |
| Se × $10^4$ | <0.35 | <0.23 | <0.014 | <0.35 | <0.24 | <0.014 | <0.35 | <0.20 | <0.014 | <0.35 | <0.21 | <0.01 |
| Te × $10^4$ | <0.14 | <0.19 | <0.006 | <0.14 | <0.20 | <0.006 | <0.14 | <0.20 | <0.006 | <0.14 | <0.17 | <0.006 |
| Mn × $10^4$ | <10 | 216 | <0.4 | 0.2 | 256 | 0.008 | 1 | 239 | 0.04 | 1 | 205 | 0.04 |
| Zn × $10^4$ | 19 | 5260 | 0.79 | 12 | 0.631 | 0.47 | 12.0 | 5885 | 0.49 | 25 | 4910 | 1.0 |
| Ni × $10^4$ | <10 | 33.3 | <0.4 | 2.5 | 41 | 0.10 | 2.0 | 43 | .08 | 2 | 34 | 0.08 |

| Run Number | E | F | G | H |
|---|---|---|---|---|
| Prep of $K_2CuCl_3$ | | | | |
| Pre. Liq. Gms | 272 | 800 | 800 | 800 |
| KCl, Gms | 35 | 104 | 104 | 104 |
| Cu°, Gms | 5 | 10 | 12 | 10 |
| $AgNO$, Gms | 0.0403 | 0 | 0.178 | 0.1260 |
| ppm Ag, Preg. Liq. | 120 | 12 | 130 | 118 |
| Method for | Sat'd. Soln Kcl dried | Sat'd. Kcl dried | Sat'd. KCl dried with | Sat'd KCl dried with |

TABLE III-continued

Crystallization of Double Salt: Inputs and Results

| Washing Crystals | with N₂ | | | with N₂ | | | N₂ | | | N₂ | | |
|---|---|---|---|---|---|---|---|---|---|---|---|---|
| | Composition Double Salt | Ion/Cu Mother Liquor | Composition Double Salt | Composition Double Salt | Ion/Cu Mother Liquor | Composition Double Salt | Composition Double Salt | Ion/Cu Mother Liquor | Composition Double Salt | Composition Double Salt | Ion/Cu Mother Liquor | Composition Double Salt |
| Ion (Wt. %) | | | | | | | | | | | | |
| Cu | 23.17 | | | 26.26[1] | | | 26.53[1] | | | 24.0 | | |
| K | 29.31 | 3.53 | 1.26 | 34.41[1] | 1.52 | 1.31 | 36.48[1] | 2.96 | 1.38 | 31.0 | 4.34 | 1.29 |
| Ag × 10⁴ | 237 | 15 | 10.2 | 13 | 2.4 | 0.50 | 89 | 39.6 | 3.4 | 97.7 | 56.1 | 4.08 |
| Sb × 10⁴ | 35.4 | 11 | 1.5 | <0.4 | <0.02 | 0.02 | 0.2 | 0.03 | 0.008 | 0.3 | 0.44 | 0.012 |
| Bi × 10⁴ | 2.8 | 25 | 0.1 | 2.0 | 10.9 | 0.08 | 1.3 | 10.8 | 0.05 | 0.60 | 39.3 | 0.026 |
| As × 10⁴ | 17.7 | 1 | 0.78 | 20.1 | 0.24 | 0.77 | 5.2 | 0.62 | 0.20 | 5.2 | 1.6 | 0.22 |
| Pb × 10⁴ | 3534 | 116 | 151 | 4000 | 36.3 | 152 | 4890 | 4.2 | 184 | 4,730 | 10.2 | 197.3 |
| Fe × 10⁴ | — | 4800 | — | 0 | 1700 | 0 | 50 | 3800 | 1.88 | 20 | 5686 | 0.82 |
| Se × 10⁴ | 2.8 | 1 | 0.1 | 1.84 | 0.093 | 0.07 | 1.7 | 0.23 | 0.06 | 0.024 | 0.26 | 0.032 |
| Te × 10⁴ | <1.9 | <0.5 | <0.2 | <0.01 | <0.008 | <0.1 | <0.015 | <0.004 | <18 | <4.1 | 0.029 | |
| Mn × 10⁴ | — | 213 | — | 0 | 75.9 | 0 | 1 | 155 | 0.04 | 79 | 226.3 | 0.18 |
| Zn × 10⁴ | 8.4 | 5200 | 0.3 | 18 | 1560 | 0.69 | 20 | 4230 | 0.76 | 2,000 | 6394 | 0.35 |
| Ni × 10⁴ | — | 39 | — | 6 | 15.4 | 0.23 | 2 | 31.8 | 0.08 | 13 | 45.3 | 0.18 |

TABLE IV

Crystallization of Double Salt - Material Balance

| Ions | Input | Output Mot. Liq. | Wash | D. Salt | Total | Mat. Bal. Wt. % |
|---|---|---|---|---|---|---|
| Test: A | | | | | | |
| K | 30.32 | 10.11 | 24.90 | 13.13 | 48.14 | 158.8[1] |
| Ag | 0.0033 | 0.0029 | 0.0003 | 0.0004 | .0036 | 109.1 |
| Cu | 15.96 | 5.40 | 2.38 | 10.11 | 17.89 | 112.1 |
| Fe | 2.80 | 2.19 | 0.11 | <0.0004 | 2.30 | 82.2 |
| Pb | 0.25 | 0.018 | 0.024 | 0.17 | 0.212 | 84.8 |
| Mn | 0.12 | 0.12 | 0.004 | <0.0004 | 0.1244 | 103.7 |
| Zn | 3.07 | 2.84 | 0.133 | 0.0008 | 2.9738 | 104.7 |
| Ni | 0.019 | 0.018 | 0.001 | <0.0004 | 0.1094 | 102.1 |
| Sb | 0.0023 | 0.004 | 0.0001 | 0.0001 | 0.0042 | 182.6 |
| Bi | 0.0098 | 0.013 | 0.0004 | 0.00014 | 0.01354 | 138.2 |
| As | 0.0010 | 0.002 | 0.00005 | 0.00012 | 0.00217 | 217 |
| Se | <0.00015 | <0.0001 | — | <0.00001 | <0.00011 | 73.3 |
| Te | <0.00017 | <0.0001 | — | <0.000006 | <0.000106 | 62.4 |
| Test: B | | | | | | |
| K | 30.33 | 9.18 | 22.06 | 16.60 | 47.84 | 1577[2] |
| Ag | 0.0033 | 0.0029 | 0.0024 | 0.00068 | 0.00598 | 181.2 |
| Cu | 15.99 | 4.59 | 7.67 | 12.56 | 24.82 | 155.2[2] |
| Fe | 2.80 | 2.83 | 0.11 | 0.0004 | 2.9404 | 105.0 |
| Pb | 0.25 | 0.046 | 0.010 | 0.18 | 0.236 | 94.4 |
| Mn | 0.12 | 0.12 | 0.0044 | 0.00001 | 0.12441 | 103.7 |
| Zn | 3.07 | 2.90 | 0.14 | 0.00060 | 3.0406 | 99.0 |
| Ni | 0.019 | 0.020 | 0.00078 | 0.00012 | 0.0209 | 110.0 |
| Sb | 0.0023 | 0.0022 | 0.00018 | 0.00021 | 0.00259 | 112.6 |
| Bi | 0.0098 | 0.011 | 0.00054 | 0.00006 | 0.0116 | 118.4 |
| As | 0.0010 | 0.0017 | 0.00011 | 0.00015 | 0.00196 | 196.0 |
| Se | <0.00015 | <0.00011 | <0.000013 | <0.00002 | <0.000143 | 95.3 |
| Te | <0.00017 | <0.000092 | <0.000011 | <0.00001 | <0.000113 | 66.5 |
| Test: C | | | | | | |
| K | 30.36 | 14.47 | 21.98 | 17.01 | 53.46 | 176.1[1] |
| Ag | 0.0033 | 0.0032 | 0.0002 | 0.0005 | .0039 | 118.2 |
| Cu | 15.99 | 4.94 | 2.03 | 11.72 | 18.69 | 116.9 |
| Fe | 2.80 | 2.77 | 0.11 | 0.001 | 2.881 | 102.9 |
| Pb | 0.25 | 0.083 | 0.017 | 0.16 | 0.260 | 104.0 |
| Mn | 0.12 | 0.12 | 0.0017 | 0.00005 | 0.12175 | 101.5 |
| Zn | 3.07 | 2.91 | 0.11 | 0.0006 | 3.0206 | 98.4 |
| Ni | 0.019 | 0.021 | 0.0007 | 0.0001 | 0.0218 | 114.7 |
| Sb | 0.0023 | 0.0007 | 0.0002 | 0.0001 | 0.0010 | 43.5 |
| Bi | 0.0098 | 0.011 | 0.0004 | 0.0001 | 0.0115 | 117.3 |
| As | 0.0010 | 0.0011 | 0.0001 | 0.0001 | 0.0013 | 130.0 |
| Se | <0.00015 | <0.00009 | <0.00005 | 0.00002 | 0.00016 | 106.6 |
| Te | <0.00017 | <0.00009 | <0.00005 | 0.00001 | 0.00015 | 88.2 |
| Test: D | | | | | | |
| K | 30.42 | 18.48 | 22.91 | 13.75 | 55.14 | 181.3[2] |
| Ag | 0.0033 | 0.0029 | 0.0021 | 0.0004 | 0.0054 | 163.6 |
| Cu | 16.10 | 5.89 | 9.55 | 10.02 | 25.46 | 158.1[2] |
| Fe | 2.82 | 2.74 | 0.073 | 0.001 | 2.814 | 99.8 |
| Pb | 0.26 | 0.014 | 0.032 | 0.19 | 0.236 | 90.8 |
| Mn | 0.13 | 0.12 | 0.0036 | 0.00004 | 0.12364 | 95.1 |
| Zn | 3.09 | 2.90 | 0.11 | 0.0010 | 3.011 | 97.4 |
| Ni | 0.019 | 0.021 | 0.0009 | 0.00008 | 0.02198 | 115.7 |
| Sb | 0.0022 | 0.0025 | 0.0001 | 0.00016 | 0.0276 | 125.5 |

TABLE IV-continued
Crystallization of Double Salt - Material Balance

| Ions | Input | Output | | | | Mat. Bal. Wt. % |
|---|---|---|---|---|---|---|
| | | Mot. Liq. | Wash | D. Salt | Total | |
| Bi | 0.0099 | 0.012 | 0.002 | 0.00004 | 0.01224 | 123.6 |
| As | 0.0010 | 0.0011 | 0.00007 | 0.00013 | 0.0013 | 130.0 |
| Se | <0.0015 | 0.00012 | <0.000006 | 0.000014 | 0.00014 | 9.3 |
| Te | <0.0017 | 0.00010 | <0.000005 | 0.000006 | 0.00011 | 6.5 |

[2]Input not corrected for Cake washed with sat'd Double Salt ($K_2CuCl_3$)

Test: E

| Ions | Input | Mot. Liq. | Wash | D. Salt | Total | Mat. Bal. Wt. % |
|---|---|---|---|---|---|---|
| K | 30.35 | 17.53 | 7.83 | 13.22 | 38.58 | 127.1[1] |
| Ag | 0.0336 | 0.0075 | 0.0011 | 0.011 | 0.0196 | 58.3 |
| Cu | 15.99 | 4.97 | 0.87 | 10.45 | 16.29 | 101.9 |
| Fe | 2.80 | 2.38 | 0.11 | NF | 2.49 | 88.9 |
| Pb | 0.25 | 0.058 | 0.011 | 0.16 | 0.229 | 91.6 |
| Mn | 0.12 | 0.11 | 0.0044 | NF | 0.1144 | 95.3 |
| Zn | 3.07 | 2.59 | 0.12 | 0.00038 | 2.71 | 88.3 |
| Ni | 0.019 | 0.019 | 0.0011 | NF | 0.0201 | 105.8 |
| Sb | 0.0023 | 0.0055 | 0.000053 | 0.0016 | 0.00715 | 311.0 |
| Bi | 0.0098 | 0.012 | 0.00025 | 0.00013 | 0.01238 | 126.3 |
| As | 0.0010 | 0.00038 | 0.000014 | 0.00080 | 0.001194 | 119.4 |
| Se | <0.00015 | 0.00050 | <0.000006 | 0.00013 | 0.000636 | 424.0 |
| Te | <0.00017 | 0.00026 | <0.000003 | <0.000086 | 0.00349 | 205.3 |

Test: F

| Ions | Input | Mot. Liq. | Wash | D. Salt | Total | Mat. Bal. Wt. % |
|---|---|---|---|---|---|---|
| K | 89.82 | 56.01 | 23.17 | 60.01[2] | 139.19 | 155.0[1] |
| Ag | 0.0096 | 0.0089 | 0.0015 | 0.0016 | 0.0120 | 125.0 |
| Cu | 47.04 | 36.89 | 4.39 | 31.72[2] | 73.00 | 155.2 |
| Fe | 8.24 | 6.40 | 1.06 | 0 | 7.46 | 90.5 |
| Pb | 0.75 | 0.16 | 0.047 | .48 | 0.687 | 91.6 |
| Mn | 0.37 | 0.33 | 0.0475 | 0 | 0.3775 | 102.0 |
| Zn | 9.04 | 6.73 | 1.22 | 0.002 | 7.952 | 88.0 |
| Ni | 0.056 | 0.067 | 0.0073 | 0.0007 | 0.0750 | 133.9 |
| Sb | 0.0067 | <0.00007 | 0.00089 | <0.00005 | 0.00101 | 15.1 |
| Bi | 0.0288 | 0.0470 | 0.00127 | 0.00024 | 0.0485 | 168.4 |
| As | 0.0030 | 0.0010 | 0.00008 | 0.0024 | 0.00348 | 116.0 |
| Se | 0.00044 | 0.0004 | 0.000010 | 0.00022 | 0.00063 | 143.2 |
| Te | 0.00050 | <0.00003 | <1. ppb | 0.00002 | 0.00005 | 10.0 |

Test: G

| Ions | Input | Mot. Liq. | Wash | D. Salt | Total | Mat. Bal. Wt. % |
|---|---|---|---|---|---|---|
| K | 89.82 | 53.66 | 35.32 | 56.58[2] | 145.56 | 162.1[1] |
| Ag | 0.1049 | 0.0718 | 0.0076 | 0.0114 | 0.0908 | 86.6 |
| Cu | 47.04 | 18.12 | 4.50 | 34.12[2] | 56.74 | 120.6 |
| Fe | 8.24 | 6.79 | 0.55 | 0.006 | 7.346 | 89.2 |
| Pb | 0.75 | 0.008 | 0.04 | 0.63 | 0.678 | 90.4 |
| Mn | 0.37 | 0.28 | 0.027 | 0.0001 | 0.3071 | 83.0 |
| Zn | 9.04 | 7.67 | 0.62 | 0.0026 | 8.2926 | 91.7 |
| Ni | 0.056 | 0.058 | 0.003 | 0.0003 | 0.0613 | 109.5 |
| Sb | 0.0067 | 0.00005 | Nil | 0.00003 | 0.00008 | 1.2 |
| Bi | 0.0288 | 0.0195 | 0.00067 | 0.00017 | 0.02034 | 70.6 |
| As | 0.0030 | 0.0011 | 0.00006 | 0.00067 | 0.00183 | 61.0 |
| Se | 0.00044 | 0.00041 | 0.00001 | 0.00022 | 0.00064 | 145.5 |
| Te | 0.00050 | 0.00003 | 0.00056 | <0.00001 | 0.00060 | 120.0 |
| Sn | — | 0.0028 | 0.00017 | 0.00129 | 0.00426 | — |

Test: H

| Ions | Input | Mot. Liq. | Wash | D. Salt | Total | Mat. Bal. Wt. % |
|---|---|---|---|---|---|---|
| K | 89.82 | 59.42 | 30.06[1] | 44.05 | 133.53 | 148.66 |
| Ag | 0.1044 | 0.0769 | 0.0056 | 0.0139 | 0.0964 | 92.34 |
| Cu | 47.04 | 13.70 | 2.56 | 34.10 | 50.36 | 107.06 |
| Fe | 8.24 | 7.27 | 0.52 | 0.0028 | 7.79 | 94.5 |
| Pb | 0.75 | 0.014 | 0.017 | 0.672 | .70 | 93.3 |
| Mn | 0.37 | 0.289 | 0.023 | 0.0006 | .31 | 83.8 |
| Zn | 9.04 | 8.18 | 0.58 | 0.0012 | 8.76 | 96.9 |
| Ni | 0.056 | 0.058 | 0.0038 | 0.0006 | 0.062 | 110.7 |
| Sb | 0.0067 | 0.0005 | 0.00002 | 0.00004 | 0.0006 | 9.0 |
| Bi | 0.0288 | 0.0383 | 0.0018 | 0.00009 | 0.0402 | 139.6 |
| As | 0.0030 | 0.0014 | 0.00006 | 0.00074 | 0.0022 | 73.3 |
| Se | <0.00044 | <0.00036 | 0.00024 | 0.000007 | 0.00011 | 25.0 |
| Te | <0.00050 | <0.00562 | <0.00029 | <0.00523 | 0.00010 | 20.0 |

[1]Input not corrected for cake washed with sat'd KCl soln.
[2]Lab results

Industrial Applicability

The process of the invention provides methods for the hydrometallurgical production of copper metal in a purer form from copper sulfide ores than known heretofore and also provides means for the production of complex salts of potassium chloride and cuprous chloride from which KCl and CuCl can be recovered. The copper, KCl, and CuCl are useful in industry.

The invention has been described herein with reference to certain preferred embodiments; however, as obvious variations thereon will become apparent to those skilled in the art, the invention is not to be considered as limited thereto.

What is claimed is:

1. In a hydrometallurgical process for the production of metallic copper comprising an oxidation stage in which materials containing copper sulfide ore or concentrates are oxidized with a solution containing ferric chloride and cupric chloride to effect substantial solubilization of the copper content of the materials in the form of cuprous chloride, a reduction stage in which any remaining cupric chloride in the solution from the oxidation stage can be reduced to cuprous chloride, an electrolysis stage in which metallic copper is recovered from the cuprous chloride solution, and cupric chloride is regenerated by electrolysis of the cuprous chloride solution from the reduction stage, and a regeneration-purge stage in which the ferric chloride and cupric chloride are regenerated by oxidation with concurrent purge of excess iron; the improved process for increasing the purity of the metallic copper recovered from the system in the electrolysis stage by removal of impurities, which comprise:

(a) effecting a separation following the first oxidation stage to remove insoluble materials and form a reduced leach solution containing cuprous chloride, cupric chloride, potassium chloride and iron chloride;

(b) adding sufficient potassium chloride to the solution to provide at least 2 moles of KCl per mole of CuCl that is to be removed from the system, and provide a solution containing about 4.0 to 6.0 molal potassium chloride;

(c) cooling the resultant saturated solution to allow precipitation of a solid complex salt of potassium chloride and cuprous chloride;

(d) removing the crystallized salt complex from the resulting reduced leach feed solution; and (e) passing the reduced feed solution to the electrolysis stage, and recovering copper of increased purity.

2. A method according to claim 1 wherein metallic copper is added to the reduced leach solution prior to addition of the potassium chloride in step (b).

3. A method according to claim 1 wherein sufficient metallic copper is added to reduce cupric chloride to cuprous chloride to result in a solution of about 2.0 molal CuCl.

4. A method according to claim 1 wherein the reduced solution is cooled to a temperature in the range of about 65° to 85° C., and the potassium chloride is added.

5. A method according to claim 4 wherein after the potassium chloride is added, the about 4.0 to 6.0 molal potassium chloride solution is cooled to a temperature of about 20° C. to 40° C. to crystallize the complex salt.

6. A method according to claim 5 wherein the complex salt can be represented by the stoichiometric chemical formula $K_2CuCl_3$.

7. A method according to claim 1 wherein sufficient metallic copper is added to the reduced leach solution prior to step (b) to reduce a sufficient amount of cupric ions present to cuprous ions so as to provide a solution containing about 1.5 to 2.5 molal cuprous chloride.

8. A method according to claim 1 wherein the temperature of the solution is in the range of about 65° to 90° C. prior to addition of the potassium chloride.

9. A method according to claim 8 wherein after addition of the potassium chloride, the resultant saturated solution is cooled to allow precipitation of the potassium chloride-cuprous chloride salt complex.

10. A method according to claim 8 wherein after the potassium chloride is added, the about 4.0 to 6.0 molal potassium chloride solution is cooled to a temperature of about 20° C. to 40° C. to crystallize the complex salt.

11. A method according to claim 1 wherein the solution has a 1.0 to 2.5 molal cuprous chloride concentration and the potassium chloride addition rate is based upon the cuprous chloride removal rate and is at least equal to 2.0 moles of potassium chloride for every mole of cuprous chloride that is to be removed.

* * * * *